(12) United States Patent
Dean et al.

(10) Patent No.: US 6,449,942 B1
(45) Date of Patent: Sep. 17, 2002

(54) SLIP JOINT DUCT SYSTEM

(75) Inventors: Michael B. Dean, Littleton; Frank C. Zegler, Idledale, both of CO (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/598,585

(22) Filed: Jun. 21, 2000

Related U.S. Application Data

(60) Provisional application No. 60/140,916, filed on Jun. 24, 1999.

(51) Int. Cl.[7] .............................. F02K 9/42; F02K 9/44
(52) U.S. Cl. .......................... 60/257; 60/800; 285/302; 285/145.1
(58) Field of Search ........................ 60/257, 258, 39.31, 60/39.32, 796–800; 285/351, 298, 302, 145.1, 145.2, 145.3

(56) References Cited

U.S. PATENT DOCUMENTS

| | | | |
|---|---|---|---|
| 72,258 A | | 12/1867 | Abbot |
| 1,947,072 A | * | 2/1934 | Walton et al. ............... 285/302 |
| 3,837,229 A | | 9/1974 | Stiles et al. .................... 74/5 R |
| 4,072,328 A | * | 2/1978 | Elliott ......................... 285/302 |
| 4,201,048 A | * | 5/1980 | Fisher et al. ................. 285/302 |
| 4,369,814 A | | 1/1983 | Humphrey .................. 138/120 |
| 4,371,198 A | * | 2/1983 | Martin ......................... 285/165 |
| 4,561,681 A | * | 12/1985 | Lebsock ...................... 285/351 |
| 4,603,892 A | * | 8/1986 | Abbes et al. ................ 285/351 |
| 4,776,617 A | * | 10/1988 | Sato ............................. 285/302 |
| 4,954,094 A | | 9/1990 | Humprey .................... 439/247 |
| 5,421,621 A | * | 6/1995 | Schaefer ...................... 285/302 |
| 5,848,812 A | * | 12/1998 | Morgan ....................... 285/351 |
| 5,897,146 A | * | 4/1999 | Saito et al. ............... 285/145.3 |
| 6,131,392 A | * | 10/2000 | Baldwin et al. ............ 285/302 |

FOREIGN PATENT DOCUMENTS

| | | |
|---|---|---|
| BE | 658926 | 5/1965 |
| DE | 2204015 | 8/1973 |
| GB | 1265791 | 3/1972 |

* cited by examiner

*Primary Examiner*—Ted Kim
(74) *Attorney, Agent, or Firm*—Marsh Fischmann & Breyfogle LLP

(57) ABSTRACT

Various joints within a duct assembly to allow relative movement between portions of a fluid system which are interconnected by this duct assembly are disclosed. This duct assembly is particularly suited for interconnecting a rocket fuel tank and rocket engine of a space travel vehicle. In any case, this duct assembly includes a pair of duct suctions, each of which includes a gimbal on an end thereof. The opposite ends of these two duct sections are disposed in a telescope-like arrangement with a slip joint therebetween to allow the duct sections to move at least generally axially relative to each other. This slip joint includes a pair of longitudinally spaced bushings, between which are disposed a plurality of annular seals. The bushings inhibit contain between the two duct sections by maintaining the same in spaced relation.

11 Claims, 2 Drawing Sheets

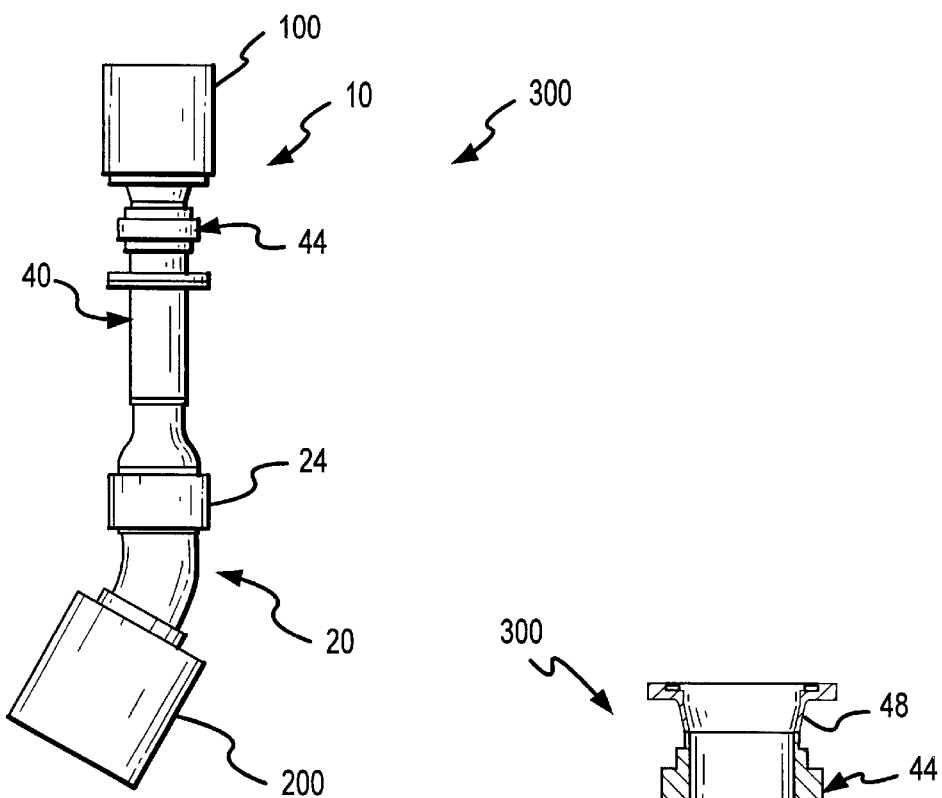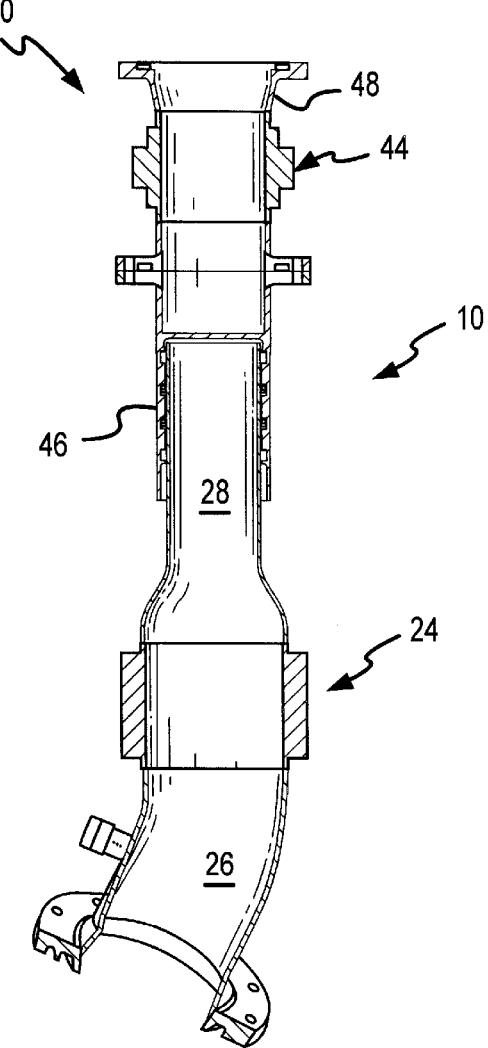
FIG.1
FIG.2

SLIP JOINT DUCT SYSTEM

CROSS-REFERENCE TO RELATED APPLICATIONS

This utility patent application claims priority from U.S. Provisional Patent Application 60/140,916, which is entitled "SLIP JOINT DUCT SYSTEM," which was filed on Jun. 24,1999, and the entire disclosure of which is incorporated by reference in its entirety herein.

STATEMENTS REGARDING FEDERALLY SPONSORED RESEARCH OR DEVELOPMENT

Not applicable.

FIELD OF THE INVENTION

The present invention generally relates to the field of fluid systems and, more particularly to joints within fluid system ducting which accommodate relative movement between different portions of the fluid system.

BACKGROUND OF THE INVENTION

In certain launch vehicles, some trajectory control of the launch vehicle in flight is provided through the use of steerable rocket engines. Such steerability is generally achieved by interconnecting actuators (e.g., hydraulic or electric) to a gimballed rocket engine. To accommodate such steerability, typical fuel lines extending between the steerable rocket engines and the fuel or propellant tanks (e.g., containing liquid oxygen or hydrogen) utilize flexible ducts. Such existing flex ducts consist of multiple flex hoses fabricated from stainless steel (e.g., for some launch vehicles, at least three flex hoses) which can be stretched, compressed or angulated in an accordion-like fashion to provide the steerability required. However, use of such flex ducts can be expensive, and the layout of such flex ducts is complex due to the length and flex requirements of the flex duct (e.g., six feet in length). In addition, such flex ducts are heavy (e.g., weighing about eighteen pounds each), and typically require a support structure (e.g., one or more dampers) to interconnect the flex duct to the bulkhead of the launch vehicle (e.g., an upper stage of the launch vehicle). Furthermore, when pressurized, such flex ducts may impart unacceptably high loads on the interfaces between the flex duct and rocket engine (e.g., flange interconnected to a turbopump of the rocket engine) because of the flex duct's propensity to stretch when pressurized, which can result in unacceptable engineering interface deflections in the turbopump.

BRIEF SUMMARY OF THE INVENTION

As such, it is an object of the present invention to provide a duct system for fluidly interconnecting first and second systems or devices, the duct system being adapted to allow at least one of angular and linear motion of the first system or device relative to the second system or device.

It is another object of the present invention to provide a propellant duct system which allows an engine in fluid communication therewith to be steered.

It is another object of the present invention to provide a propellant duct system which allows a rocket engine gimbal assembly to move linearly and angularly relative to the sump or propellant gimbal assembly.

It is yet another object of the present invention to provide a propellant duct system which accommodates about four degrees of angular motion and/or linear motion of a rocket engine relative to a fuel or propellant tank.

It is still another object of the present invention to provide a propellant duct system which is simple, lightweight, dynamically sealed and uncompensated, the propellant duct system extending between a steerable rocket engine and a propellant or fuel tank.

One propellant duct system in accordance with principles of the present invention achieves one or more of these objectives by providing a system which is dual gimballed, uncompensated, dynamically sealed and lightweight. In particular, this particular propellant duct system of the present invention accommodates rocket engine gimbal motion through the use of at least a first gimbal joint which allows rotational or angular rocket engine motion relative to a propellant tank in fluid communication therewith and a dynamic, redundantly sealed slip joint which allows linear rocket engine motion relative to the propellant tank. Through the use of such components, a flexible fuel line of reduced length (e.g., 2 feet, as opposed to 6 feet in current flex ducts) and weight (e.g., nine pounds, as opposed to 18 pounds in current flex ducts) is achieved. In addition, the propellant duct system of the present invention does not require the use of dampers to support the same.

A first aspect of the present invention is a fluid system which includes a fluid duct assembly which may be used to fluidly interconnect certain fluid system components (e.g., a rocket engine and a rocket fuel tank). This fluid duct assembly includes first and second duct sections. These first and second duct sections are interconnected by a first slip joint which allows the first duct section to effectively slide relative to the second duct to section (e.g., relative linear motion). Other joints exist in the fluid duct assembly. In this regard, a first gimbal joint is interconnected with the first duct section and a second gimbal joint is interconnected with the second duct section. Both the first and second gimbal joints accommodate certain types relative movement of their corresponding first and second duct sections (e.g., angular or rotational motion). In one embodiment, the first slip joint is disposed somewhere between the first and second gimbal joints.

Various refinements exist of the features noted in relation to the first aspect of the present invention. Further features may also be incorporated in the first aspect of the present invention as well. These refinements and additional features may exist individually or in any combination. Both the first and second duct sections may include what may be characterized as first and second ends which are longitudinally spaced in that the distance between these ends may define a length dimension for the respective first and second duct section. The first gimbal joint may be interconnected with the first end of the first duct section and the second gimbal joint may be interconnected with the first end of the second duct section. This arrangement allows the second end of the first duct section to extend through the second end of the second duct section and at least partially within the second duct section, or vice versa, for instance in a concentric relation. In any case, the first slip joint could then be disposed within an annular space which may exist between concentric portions of the first and second duct sections or those portions of the first and second duct sections which define a telescope-like arrangement.

Components of the first slip joint may include a pair of longitudinally-spaced bushings and at least one annular seal which is disposed at an intermediate location between these pair of longitudinally-spaced bushings. Preferably all annular seals are disposed somewhere between these pair of longitudinally-spaced bushings. Multiple functions may be provided by these bushings. Initially, the bushings may be incorporated in the first slip joint so as to inhibit contact between the first and second duct sections. Moreover, these bushings may be incorporated in the first slip joint so as to carry a load which is exerted on the duct assembly and applied in some manner to the first slip joint. Consider the case where the second end of the first duct section extends through the second end of the second duct section to concentrically dispose the first duct section relative to the second duct section. An outer wall of the first duct section may include a plurality of annular grooves which are longitudinally-spaced. Each annular seal may be disposed in its own annular groove on the outer wall of the first duct section and may be biased toward and in engagement with a portion of an inner wall of the second duct section and a portion of the outer wall of the first duct section (which includes the groove) by its own biasing member (e.g., a spring which is disposed within a generally u-shaped section of its corresponding annular seal). Annular grooves may be provided for each of the noted bushings as well. Each of the annular seals may be disposed at some longitudinal position between the pair of longitudinally-spaced bushings. Having the bushings be "thicker" than their corresponding annular groove results in these bushings extending beyond the outer wall of the first duct section so as to provide one or more of the above-noted functions.

The duct assembly of the subject first aspect is particularly suited for fluidly interconnecting a rocket engine and a rocket fuel tank. The arrangement presented by the subject first aspect allows an appropriate rocket fuel (e.g., a liquid propellant) to be directed from the fuel tank to the rocket engine. Moreover, the arrangement provided by the subject first aspect allows the length of the duct assembly which interconnects this rocket engine and fuel tank to be significantly reduced, and in one embodiment the length of the duct assembly may be about 2 feet. This reduced length provides the benefit of reducing material costs, reducing the weight of the entire fluid system and thereby a space travel vessel which includes the same.

A second aspect of the present invention is a fluid system which includes a fluid duct assembly which may be used to fluidly interconnect certain fluid system components (e.g., a rocket engine and a rocket fuel tank). This fluid duct assembly includes first and second duct sections. These first and second duct sections are interconnected by a first slip joint which allows the first duct section to effectively slide relative to the second duct section (e.g., relative linear motion). Components of the first slip joint include a pair of longitudinally-spaced bushings and at least one annular seal which is disposed at an intermediate location between these pair of longitudinally-spaced bushings. All annular seals of the first slip joint utilized by the subject second aspect of the present invention are preferably disposed somewhere between its pair of longitudinally-spaced bushings.

Various refinements exist of the features noted in relation to the first aspect of the present invention. Further features may also be incorporated in the first aspect of the present invention as well. These refinements and additional features may exist individually or in any combination. Both the first and second duct sections may include what may be characterized as first and second ends which are longitudinally spaced in that the distance between these ends may define a length dimension for the respective first and second duct section. The second end of the first duct section may extend through the second end of the second duct section and at least partially within the second duct section, or vice versa, for instance in a concentric relation. In either case, the first slip joint may then be disposed within an annular space which may exist between the concentric portions of the first and second duct sections or between those portions of the first and second duct sections which define a telescope-like arrangement.

Multiple functions may be provided by the bushings in the first slip joint utilized by the subject second aspect of the present invention. Initially, the bushings may be incorporated in the first slip joint so as to inhibit contact between the first and second duct sections. Moreover, these bushings may be incorporated in the first slip joint so as to carry a load which is exerted on the duct assembly and applied in some manner to the first slip joint. Consider the case where one end of the first duct section extends through one end of the second duct section to concentrically dispose the first duct section relative to the second duct section or so as to define a telescope-like arrangement. An outer wall of the first duct section may include a plurality of annular grooves which are longitudinally-spaced. Each annular seal may be disposed in its own annular groove on the outer wall of the first duct section and may be biased toward and in engagement with a portion of an inner wall of the second duct section and a portion of the outer wall of the first duct section (which includes the groove) by its own biasing member (e.g., a spring which is disposed within a generally u-shaped section of its corresponding annular seal). Annular grooves may be provided for each of the noted bushings as well. Each of the annular seals may be disposed at some longitudinal position between the pair of longitudinally-spaced bushings. Having the bushings be "thicker" than their corresponding annular groove results in these bushings extending beyond the outer wall of the first duct section so as to provide one or more of the above-noted functions.

Other joints may exist in the fluid duct assembly utilized by the subject second aspect of the present invention. In this regard, a first gimbal joint may be interconnected with the first duct section and a second gimbal joint may be interconnected with the second duct section. Both the first and second gimbal joints accommodate certain types relative movement of their corresponding first and second duct section (e.g., angular or rotational motion). In one embodiment, the first slip joint is disposed somewhere between the first and second gimbal joints. Typically these first and second gimbal joints will be disposed on ends of their respective first and second duct section which is disposed beyond the first slip joint.

BRIEF DESCRIPTION OF THE SEVERAL VIEWS OF THE DRAWING

FIG. 1 is a side plan view of one embodiment of a fluid system.

FIG. 2 is a cutaway view of the fluid system of FIG. 1 which illustrates certain details of a slip joint used by the fluid system of FIG. 1.

DETAILED DESCRIPTION OF THE INVENTION

Figure 3:
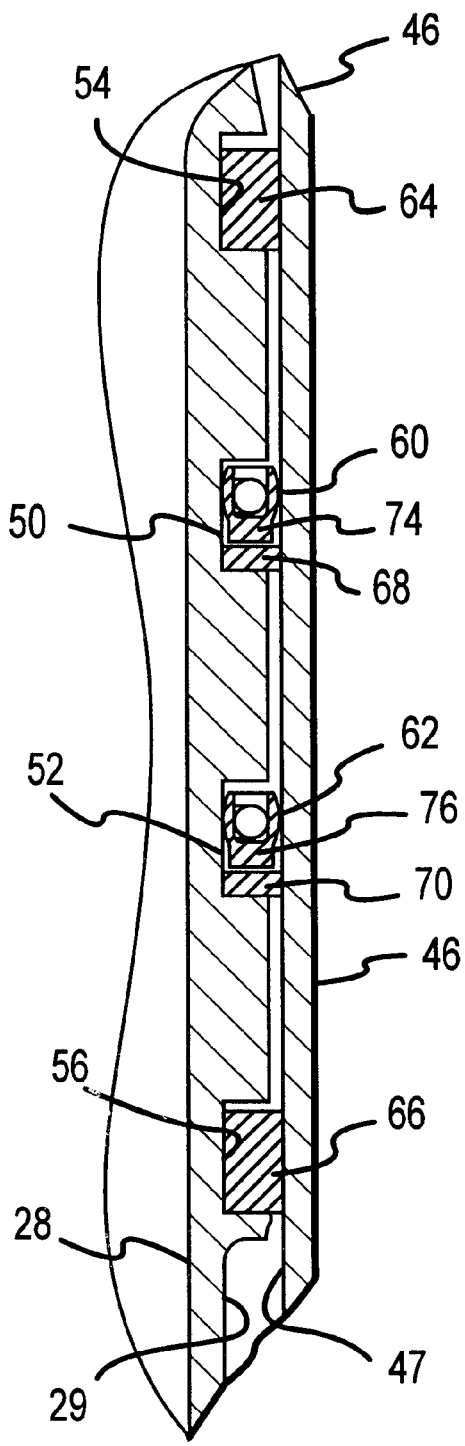
FIG. 3 is an enlarged cross-sectional view of part of the slip joint presented in FIG. 2.

The present invention will now be described in relation to the accompanying drawings which at least assist in illustrating its various pertinent features. Referring to FIGS. 1–3 of the present application, the duct assembly or propellant duct 10 functions to supply or transfer a liquid propellant, such as liquid oxygen or hydrogen, from a propellant tank 200 to a steerable rocket engine 100, all of which are part of a fluid system 300. In one embodiment, the duct 10 includes first and second sections 20, 40, which are in fluid communication with the tank 200 and the steerable rocket engine 100, respectively. More specifically, the first section 20 includes a first gimbal joint 24 for allowing angular motion (e.g., about two degrees of angulation) and the second section 40 includes a second gimbal joint 44 for allowing angular motion (e.g., about two degrees of angulation). Such gimbal joints 24, 44 allow the rocket engine 100 to angulate relative to the tank 200, and are commercially available from various vendors, such as Arrowhead Products, Inc.

The first and second sections 20, 40 include first and second end portions 26, 28, 46, 48, respectively. The first end portion 46 of the second section 40 is slidably engaged with the second end portion 28 of the first section 20 to allow the first section 20 to move linearly relative to the second section 40. Such linear movement allows the duct 10 to lengthen during steering. In particular, the second end portion 28 of the first section 20 includes at least first and second annular grooves 50, 52 formed on an outer wall 29 thereof for receiving first and second annular seal rings 60, 62, respectively, and springs 74, 76, which function to maintain sealing contact between the sealing surfaces of an inner wall 47 of the first end portion 46 of the second section 40 and the outer wall 29 of the second end portion 28 of the first section 20. Also receivable within the first and second annular grooves 50, 52 are backup rings 68, 70, respectively, which function to support the seal rings 60, 62 (e.g., to inhibit extrusion of the seal rings 60, 62). The second end portion 28 may further include third and fourth annular grooves 54, 56 formed on its outer wall 29 for receiving first and second annular ride rings 64, 66, respectively. The ride rings 64, 66 function as bushings to carry the loads imparted on this interface area between the first and second sections 20, 40, which in turn inhibits metal-to-metal contact between the first and second end portions 46, 28 of the second and first sections 40, 20 (e.g., which may comprise a corrosion resistant steel, such as 321 cres, or a hard, anodized aluminum, such as Al 6061) to thereby reduces leakage of the fluid or propellant therethrough. Such rings may be fabricated from a material which is resistant to corrosion from the propellant (e.g., liquid oxygen). In this regard, the rings may comprise a material which is capable of withstanding the environment (e.g., temperature and corrosiveness of the fluid), such as an elastomer (e.g., polyethylene, ethylpropylene rubber, glass filled Teflon, etc.).

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A fluid system, comprising:
   a fluid duct assembly which comprises first and second duct sections, first and second gimbal joints interconnected with said first and second duct sections, respectively, and a first slip joint which slidably interconnects said first and second duct sections and which is both dynamic, redundantly sealed, wherein said first slip joint is disposed between said first and second gimbal joints, wherein said first duct section comprises first, second, third, and fourth annular grooves that are longitudinally spaced, wherein said first slip joint comprises a first annular seal disposed in said first annular groove, a second annular seal disposed in said second annular groove, a first bushing disposed in said third annular groove and being a different structure than said first duct section, and a second bushing disposed in said fourth annular groove and being a different structure than said first duct section, wherein said first and second annular grooves are located at some longitudinal location that is between said third and fourth annular grooves;
   a rocket fuel tank which is interconnected with one of said first duct section and said second duct section; and
   a rocket engine which is interconnected with the other of said first duct section and said second duct section.

2. A fluid system, as claimed in claim 1, wherein:
   said first and second duct sections each comprise first and second longitudinally spaced ends, wherein said first gimbal joint is interconnected with said first end of said first duct section, wherein said second gimbal joint is interconnected with said first end of said second duct section, wherein said second end of one of said first and second duct sections extends within said second end of the other of said first and second duct sections, and wherein said first slip joint is disposed between an annular space between portions of said first and second duct sections.

3. A fluid system, as claimed in claim 1, wherein:
   said first slip joint interconnects said first and second duct sections in telescoping relation, wherein said first and second bushings comprise means for inhibiting contact between said first and second duct sections.

4. A fluid system, as claimed in claim 1, wherein:
   said first and second bushings comprise means for carrying a load which is exerted on said duct assembly and applied to said first slip joint.

5. A fluid system, as claimed in claim 1, wherein:
   said first and second annular seals each comprises first and second legs with a first space therebetween, wherein said first leg interfaces with said first duct section and said second leg interfaces with said second duct section, wherein said first slip joint further comprises first and second annular biasing members disposed in said first space of said first and second annular seals, respectively, wherein each of said first and second annular biasing members biases its corresponding said first leg toward said first duct section and its corresponding said second leg toward said second duct section.

6. A fluid system, as claimed in claim 5, wherein said first slip joint comprises:
   means for inhibiting extrusion of said first and second annular seals.

7. A fluid system, as claimed in claim 5, wherein said first slip joint comprises:
   first and second backup rings disposed in said first and second annular grooves, respectively, and engaged with an end of said first and second annular seals that is opposite an end of said first and second annular seals that has said first and second legs and said first space therebetween.

8. A fluid system, as claimed in claim 1, wherein:

a length of said duct assembly is about 2 feet.

9. A fluid system, as claimed in claim 1, further comprising:

a liquid propellant disposed within said fluid duct assembly.

10. A fluid system, as claimed in claim 1, wherein said first slip joint comprises:

means for inhibiting extrusion of said first and second annular seals.

11. A fluid system, as claimed in claim 1, wherein said first slip joint comprises:

first and second backup rings disposed in said first and second annular grooves, respectively, and engaged with an end of said first and second annular seals that is opposite an end of said first and second annular seals that has said first and second legs and said first space.

* * * * *